United States Patent
Choi et al.

(10) Patent No.: US 12,373,595 B2
(45) Date of Patent: *Jul. 29, 2025

(54) METHOD AND SYSTEM FOR CONFIDENTIAL COMPUTING

(71) Applicant: REBELLIONS INC., Seongnam-si (KR)

(72) Inventors: Myunghoon Choi, Seongnam-si (KR); Chang-Hyo Yu, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,736

(22) Filed: May 8, 2024

(65) Prior Publication Data
US 2024/0296245 A1    Sep. 5, 2024

Related U.S. Application Data

(63) Continuation of application No. 18/338,264, filed on Jun. 20, 2023, now Pat. No. 12,008,132.

(30) Foreign Application Priority Data

Feb. 1, 2023   (KR) .................. 10-2023-0013955

(51) Int. Cl.
 *H04L 29/06*   (2006.01)
 *G06F 21/62*   (2013.01)

(52) U.S. Cl.
 CPC ............................... *G06F 21/6227* (2013.01)

(58) Field of Classification Search
None
See application file for complete search history.

(56) References Cited

U.S. PATENT DOCUMENTS

| | | | |
|---|---|---|---|
| 8,843,767 B2 * | 9/2014 | Hars | G06F 12/1408 713/190 |
| 11,669,368 B2 * | 6/2023 | Doshi | H04L 41/145 713/168 |

(Continued)

FOREIGN PATENT DOCUMENTS

| | | |
|---|---|---|
| JP | 2021-533619 A | 12/2021 |
| KR | 10-2018-0038732 A | 4/2018 |

(Continued)

OTHER PUBLICATIONS

Office Action for KR 2023-0013955 by Korean Intellectual Property Office dated Nov. 18, 2024.

*Primary Examiner* — Maung T Lwin
(74) *Attorney, Agent, or Firm* — BROADVIEW IP LAW, PC

(57) ABSTRACT

A method for confidential computing is provided, which is performed by a security core including one or more processor, and includes storing first encrypted data associated with a first tenant in a first memory, in which the first encrypted data is obtained by performing encryption of the first plaintext data using a first encryption key associated with the first tenant, in response to receiving a request to access the first plaintext data, decrypting the first encrypted data using the first encryption key so as to generate the first plaintext data, and providing the first plaintext data to a main core that processes data stored in the first memory.

20 Claims, 17 Drawing Sheets

(56) References Cited

U.S. PATENT DOCUMENTS

| | | | |
|---|---|---|---|
| 11,687,681 B2* | 6/2023 | Gueron | G06F 21/75 |
| | | | 713/193 |
| 2015/0304310 A1* | 10/2015 | Roth | H04L 9/0894 |
| | | | 713/158 |
| 2019/0095350 A1* | 3/2019 | Durham | G06F 12/145 |
| 2019/0102577 A1* | 4/2019 | Gueron | G06F 21/79 |
| 2020/0125742 A1* | 4/2020 | Kounavis | H04L 9/0822 |
| 2021/0182423 A1* | 6/2021 | Padmanabhan | H04L 9/3271 |
| 2021/0377020 A1* | 12/2021 | Kashid | H04L 9/083 |
| 2022/0067193 A1* | 3/2022 | Singh | G06F 21/602 |
| 2022/0335140 A1* | 10/2022 | Sultana | G06F 21/602 |

FOREIGN PATENT DOCUMENTS

| KR | 10-2021-0069473 A | 6/2021 |
|---|---|---|
| KR | 10-2021-0130840 A | 11/2021 |

* cited by examiner

METHOD AND SYSTEM FOR CONFIDENTIAL COMPUTING

CROSS-REFERENCE TO RELATED APPLICATION

This application is a continuation application of U.S. patent application Ser. No. 18/338,264, filed on Jun. 20, 2023, which claims priority to Korean Patent Application No. 10-2023-0013955, filed in the Korean Intellectual Property Office on Feb. 1, 2023, the entire contents of which are hereby incorporated by reference.

TECHNICAL FIELD

The present disclosure relates to a method and system for confidential computing, and more specifically, to a method and system for confidential computing for maintaining confidentiality of data in a multi-tenant environment providing computing services to a plurality of tenants.

BACKGROUND

Confidential computing is a method for preventing data from exposure to a malicious attack by encrypting the data used for computation, and in other words, it is a method for maintaining confidentiality of the data. In particular, it is very important to maintain data confidentiality in a multi-tenant environment in which a single system provides services to a plurality of user groups.

According to a related system that provides services to a plurality of users, in order to maintain confidentiality, a rule may be stipulated that a user terminal encrypts the data before transmitting data to the system. If the system receives the encrypted data from the user terminal, the system may decrypt the encrypted data and store the decrypted data in a memory in the form of plaintext. Meanwhile, as described above, if the data is stored in the memory in the form of plaintext, the data may be exposed to malicious attacks.

SUMMARY

In order to solve the problems described above, the present disclosure provides a method for, a non-transitory computer-readable recording medium storing instructions for, and an apparatus (system) for confidential computing.

The present disclosure may be implemented in a variety of ways, including a method, an apparatus (system), or a non-transitory computer-readable recording medium storing instructions.

According to some embodiments of the present disclosure, a method for confidential computing is provided, which may be performed by a security core including one or more processors and include storing first encrypted data associated with a first tenant in a first memory, in which the first encrypted data is obtained by performing encryption of the first plaintext data using a first encryption key associated with the first tenant, in response to receiving a request to access the first plaintext data, decrypting the first encrypted data using the first encryption key so as to generate the first plaintext data, and providing the first plaintext data to a main core that processes data stored in the first memory.

According to some embodiments, the decrypting the first encrypted data may be performed using a crypto accelerator for acceleration of at least one of encryption or decryption.

According to some embodiments, the method may further include storing second encrypted data associated with a second tenant in the first memory, wherein the second encrypted data may be obtained by performing encryption of second plaintext data using a second encryption key associated with the second tenant, and the first and second encryption keys may be different from each other.

According to some embodiments, the first encrypted data may be data received from a device associated with the first tenant.

According to some embodiments, the method may further include encrypting third plaintext data generated as a result of processing the first plaintext data by the main core using the first encryption key so as to generate third encrypted data, and the generated third encrypted data may be transmitted to a device associated with the first tenant.

According to some embodiments, the method may further include, prior to storing the first encrypted data associated with the first tenant in the first memory, decrypting fourth encrypted data using a third encryption key so as to generate the first plaintext data, wherein the fourth encrypted data may be data received from a device associated with the first tenant, the fourth encrypted data may be obtained by performing encryption of the first plaintext data using the third encryption key, encrypting the first plaintext data using the first encryption key as a new encryption key so as to generate the first encrypted data, and the first and third encryption keys may be different from each other.

According to some embodiments, the method may further include encrypting the third plaintext data generated as a result of processing the first plaintext data by the main core using the third encryption key so as to generate fifth encrypted data, and the fifth encrypted data may be transmitted to a device associated with the first tenant.

According to some embodiments, the first encrypted data may be associated with a first user belonging to the first tenant, and the method may further include storing sixth encrypted data associated with a second user belonging to the first tenant in the first memory, wherein the sixth encrypted data may be obtained by performing encryption of fourth plaintext data using a fourth encryption key, and the first and fourth encryption keys may be different from each other.

According to some embodiments, the decrypting the first encrypted data so as to generate the first plaintext data may include in response to receiving a request to access the first plaintext data from a device associated with the first tenant, checking whether the device associated with the first tenant has an authorized access to the first plaintext data, and if confirming that the device associated with the first tenant has the authorized access to the first plaintext data, decrypting the first encrypted data using the first encryption key so as to generate the first plaintext data.

According to some embodiments, the method may further include, in response to receiving a request to access the first plaintext data from an external device, checking whether the external device has an authorized access to the first plaintext data, and if determining that the external device has no authorized access to the first plaintext data, rejecting the request to access of the external device, storing a log of inappropriate request to access, and notifying a host of the inappropriate access.

According to some embodiments, the method may further include, determining if reuse of the first plaintext data is possible, storing the first plaintext data in a memory, wherein the memory may be the first memory or a second memory accessible only by the security core and not accessible by the main core.

According to some embodiments, the first plaintext data may be stored in the first memory or the second memory based on a security level of the first plaintext data.

According to some embodiments, the method may further include, in response to receiving a request to access the first plaintext data stored in the memory from an external device, checking whether the external device has an authorized access to the first plaintext data.

According to some embodiments, the method may further include, determining if use of the first plaintext data is finished, storing a pre-specified value in an area of memory in which the first plaintext data is stored.

According to some embodiments of the present disclosure, a computing device is provided, which may include a first memory, a main core configured to load and drive or process at least some of data stored in the first memory, and a security core configured to store first encrypted data associated with a first tenant in the first memory, wherein the first encrypted data may be obtained by performing encryption of first plaintext data using a first encryption key associated with the first tenant, in response to receiving a request to access the first plaintext data, decrypt the first encrypted data using the first encryption key so as to generate the first plaintext data, and provide the first plaintext data to the main core.

According to some embodiments, the computing device may further include a crypto accelerator for acceleration of at least one of encryption or decryption, wherein the crypto accelerator is accessible only by the security core, in which the security core may be configured to perform at least one of encryption or decryption using the crypto accelerator.

According to some embodiments, the first encryption key associated with the first tenant may be different from a second encryption key associated with a second tenant, and matching information between a plurality of tenants and a plurality of encryption keys may be accessible only by the security core and not accessible by the main core.

According to some embodiments, the first encryption key associated with the first tenant may be an encryption key associated with a first user belonging to the first tenant, the first encryption key may be different from a third encryption key associated with a second user belonging to the first tenant, and matching information between a plurality of users and a plurality of encryption keys may be accessible only by the security core and not accessible by the main core.

According to some embodiments, the security core may be configured to, in response to receiving a request to access the first plaintext data from an external device, prior to decrypting the first encrypted data to generate first plaintext data, check whether the external device has an authorized access to the first plaintext data.

According to some embodiments, the main core may be configured to process the first plaintext data provided by the security core to generate third plaintext data, and the security core may be configured to perform encryption of the third plaintext data using the first encryption key to generate second encrypted data, and transmit the second encrypted data to a device associated with the first tenant.

According to some embodiments, the computing system may decrypt the encrypted data received from the tenant and store the decrypted data in the memory in the encrypted form, instead of storing the decrypted data in the memory in the form of plaintext, thereby maintaining confidentiality of the data.

According to some embodiments, after decrypting the encrypted data received from the tenant, the computing system may encrypt the decrypted data with a new encryption key and store the encrypted data in memory, thereby reducing or minimizing the risk of exposure of the encryption key.

According to some embodiments, the computing system may differently designate and manage encryption keys associated with each tenant and/or encryption keys associated with each user, thereby further improving confidentiality of the data.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
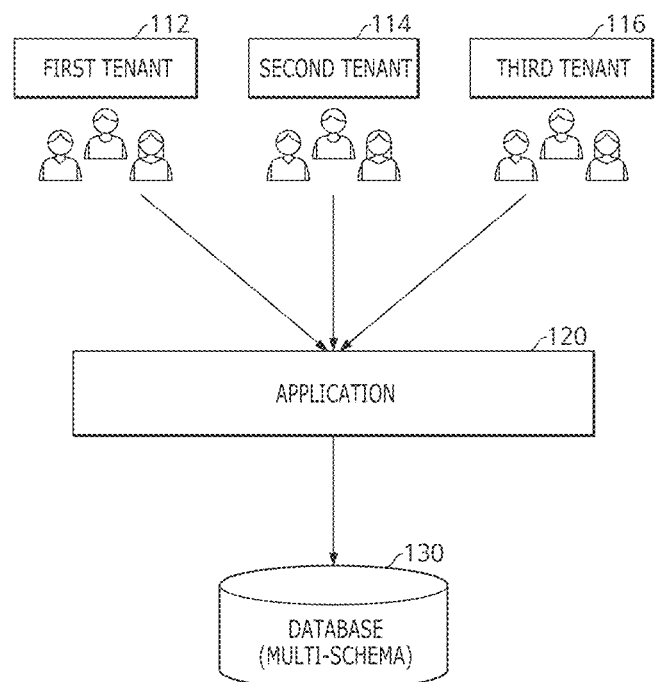
FIG. 1 is a diagram provided to explain an example of a multi-tenant environment.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to control one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "each of a plurality of A" may refer to each of all components included in the plurality of A, or may refer to each of some of the components included in a plurality of A.

The terms "comprises", "comprising", "includes", "including", "have", "having", "contains", "containing", "carries", "carrying", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the present disclosure, "plaintext data" may refer to non-encrypted data (decrypted data) in the form of plaintext. If encryption is performed on plaintext data, the encrypted data in the form of ciphertext may be generated. In addition, if the encrypted data is decrypted in an appropriate manner, the plaintext data may be derived.

Terms such as first, second, A, B and so on used in this specification and claims may be used in describing a variety of elements, but these elements should not be limited to the expression. The expressions are used only for the purpose of distinguishing one element from another. In addition, terms such as "first," "second," and so on as used in each drawing are only used for the purpose of distinguishing one element from another element in that drawing, and the elements should not be limited by these terms. For example, the first component and the second component described in the same drawing may be the same as or different from each other. As another example, a first element illustrated in FIG. 4 and a first element illustrated in FIG. 6 may be the same as or different from each other.

FIG. 1 is a diagram provided to explain an example of a multi-tenant environment. A computing system may provide computing services to a plurality of tenants 112, 114, and 116 using the same physical infrastructure or the same physical device. In this example, the tenant may refer to a group of users that are provided with the computing service and have the same purpose. For example, each of the tenants 112, 114, and 116 may include a group of users who belong to the same company, a group of users who work on the same project (e.g., a project for developing a specific neural network), or the like.

According to some embodiments, in the multi-tenant environment, the plurality of tenants 112, 114, and 116 may use the same application instance 120 to be provided through computing services. In addition, data transmitted by the plurality of tenants 112, 114, and 116 to the computing system to request storage and/or processing of data may be stored in a database 130 built on the same physical infrastructure or the same physical device. In this multi-tenant environment, it is very important to maintain confidentiality of data to keep the data of each tenant 112, 114, and 116 from exposure to one another and to other tenants. In addition, even among a plurality of users belonging to the same tenant, there is a need to ensure the confidentiality of the data that includes sensitive information, such as user personal information.

According to some embodiments, in the multi-tenant environment described above, the computing system may provide computing services while safely protecting the data of each of the tenants 112, 114, and 116 or the data of each user by performing a method for confidential computing to maintain confidentiality of data.

Figure 2:
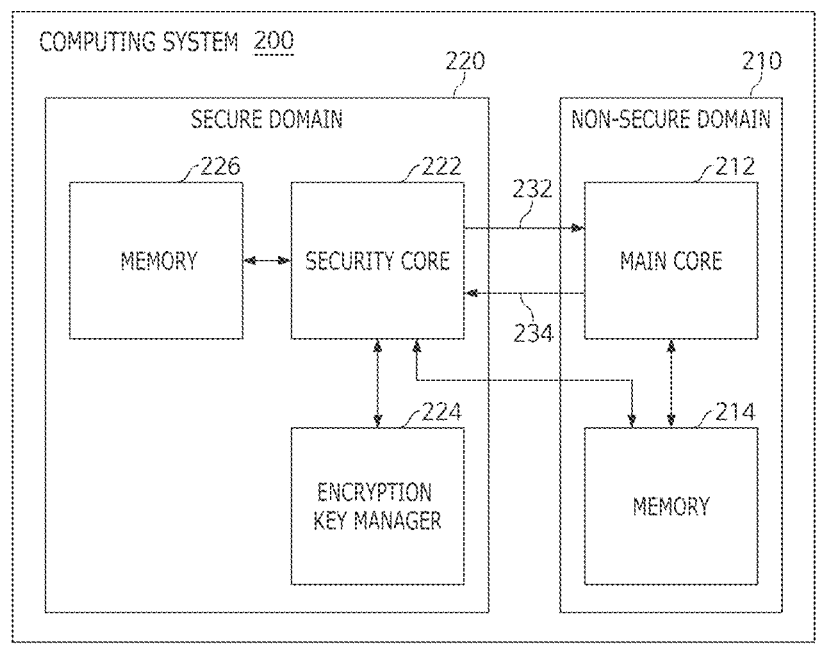
FIG. 2 is a block diagram illustrating an example of a computing system.

FIG. 2 is a block diagram illustrating an example of a computing system 200. The computing system 200 may be divided into a non-secure domain 210 and a secure domain 220. The non-secure domain 210 may include a main core 212 and a memory 214. The secure domain 220 may include a security core 222, an encryption key manager 224, and a memory 226. FIG. 2 illustrates only an example of the computing system 200, and is not intended to exclusively illustrate the essential components of the computing system 200, and accordingly, since FIG. 1 does not illustrate all configurations of the computing system 200, at least some of the illustrated components may be omitted and/or other components may be further included.

The non-secure domain 210 may include hardware and/or software areas other than the secure domain 220 in the computing system 200. For example, the non-secure domain 210 may include the main core 212 and the memory 214.

According to some embodiments, the secure domain 220 may include the security core 222 and the hardware and/or software domains accessible only by the security core 222. For example, the secure domain 220 may include the security core 222, the encryption key manager 224, and the memory 226. Since the secure domain 220 is an area where the security-related tasks are performed, the components inside and outside the system other than the security core 222 can access the security core 222 only for limited purposes, such as transmitting a request to access encrypted data, and access to the secure domain 220 for the other purposes may be limited.

According to some embodiments, the main core 212 may be a core that performs computational tasks. Additionally or alternatively, the main core 212 may be a core that manages cores that perform computational tasks or a core that distributes tasks. For example, the main core 212 may load stored data of the memory 214 in the non-secure domain 210 and process (e.g., compute) or drive the data. However, aspects of the present disclosure are not limited to the above.

According to some embodiments, the memory 214 in the non-secure domain 210 may be a volatile memory and/or a non-volatile memory for storing data to be processed by the main core 212 and the security core 222 or data generated as a result of processing. However, aspects of the present disclosure are not limited to the above.

According to some embodiments, the security core 222 may be a core that performs computational tasks for security purposes. Additionally or alternatively, the security core 222 may be a core that manages cores performing computational tasks for security purposes or a core that distributes tasks. For example, the security core 222 may perform data encryption/decryption, data integrity check, management of authorized access to data, and the like. In addition, since the security core 222 may be able to stop the operations of all systems, except for the main core 212, when a security-related problem occurs, it may have the highest priority among the cores of the computing system 200. In this configuration, the security core 222 may have or may be accessible to all components of the computing system 200.

According to some embodiments, the encryption key manager 224 may be hardware and/or software that manages encryption keys associated with encryption and/or decryption operations performed by the security core 222. For example, the encryption key manager 224 may be a block responsible for generating and managing encryption keys. The encryption key may be generated through a dedicated core (e.g., a key derivation core) in the encryption key manager 224 block. The encryption key manager 224 may manage information on individual encryption keys (e.g., a matching relationship between data and an encryption key, a matching relationship between a host device and an encryption key, a matching relationship between a tenant and an encryption key, a matching relationship between a user and an encryption key, and the like).

According to some embodiments, there may be an area for storing an encryption key (e.g., a key generated by the encryption key manager 224 or a key transmitted from outside the system) and individual encryption key information in the memory 226 in the secure domain 220. Access to this area may be available only to the encryption key manager 224. Additionally or alternatively, a memory (not illustrated) dedicated to the encryption key manager 224 may be included in the encryption key manager 224 block, and an encryption key and individual encryption key information may be stored in the memory dedicated to the encryption key manager 224. In FIG. 2, the encryption key manager 224 is illustrated as a separate component from the security core 222, but this is for convenience of explanation only, and aspects of the present disclosure are not limited thereto. For example, at least some components of the encryption key manager 224 may be included in the security core 222.

According to some embodiments, the memory 226 in the secure domain 220 may be a volatile memory and/or a non-volatile memory accessible only by the security core 222. For example, the memory 226 in the secure domain 220 may be a volatile memory and/or a non-volatile memory for storing data for which confidentiality is to be maintained.

According to some embodiments, a security main interconnection 232 may transmit data and control signals between the security core 222 and the main core 212. In this case, the security core 222 may have a higher priority than the main core 212. Accordingly, the security core 222 may access all parts of the main core 212 and may also instruct the main core 212 to or not to operate. Accordingly, if a security-related problem occurs, the security core 222 may stop the operation of the main core 212 and have authorization to control over the entire system. With this, if tampering of the data is detected in the integrity check process, the security core 222 may be able to smoothly perform system protection and/or recovery processes. For example, the security core 222 may be able to perform system protection and/or recovery processes without interruption.

According to some embodiments, a main security interconnection 234 may transmit data and control signals between the main core 212 and the security core 222. In this case, the main core 212 may access only a limited part of the security core 222 through the main security interconnection 234. Accordingly, the security of the security core 222, which is responsible for security, may be maintained, and thus confidentiality of data can be maintained and the risk of tampering of the computing system 200 can be prevented.

Figure 3:
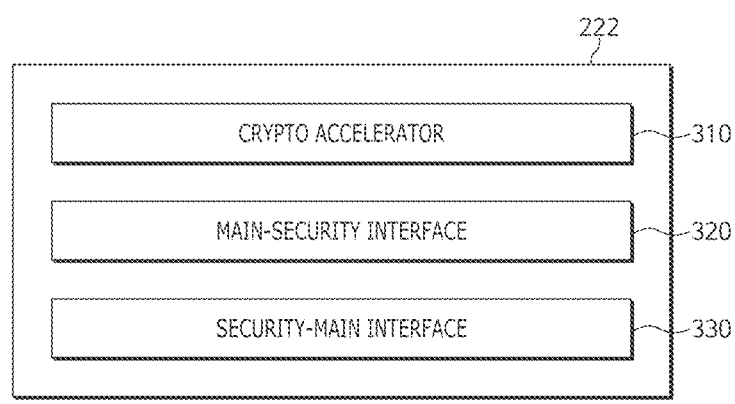
FIG. 3 is a block diagram illustrating an example of an internal configuration of a security core.

FIG. 3 is a block diagram illustrating an example of the internal configuration of the security core 222. FIG. 3 illustrates only an example of the internal configuration of the security core 222, and is not intended to exclusively illustrate the essential configurations of the security core 222, and accordingly, since FIG. 3 does not illustrate all internal configurations of the security core 222, at least some of the illustrated components may be omitted and/or other components may be further included. According to some embodiments, the security core 222 may include a crypto accelerator 310, a main-security interface 320, and a security-main interface 330.

According to some embodiments, the crypto accelerator 310 may perform crypto operations (e.g., encryption and/or decryption operations). For example, the crypto operation may include an operation that uses at least one of symmetric key encryption/decryption algorithms such as AES and SEED, asymmetric key encryption/decryption algorithms such as RSA and DSA, and one-way encryption algorithms (e.g., hash algorithms such as CRC, MD5, RIPEMD160, SHA-1, SHA-256, SHA-512, and the like).

The crypto accelerator 310 may be hardware specialized for the crypto operations to allow the security core 222 to perform crypto operations smoothly. With this configuration, the accuracy and speed of the encryption operation of the security core 222 may be further improved.

The main-security interface 320 and the security-main interface 330 may operate between the main core and the security core 222.

The main-security interface 320 may be connected to the main security interconnection. The main-security interface 320 together with the main security interconnection may control such that, when the main core accesses the security core 222, the main core is restricted to access only a non-security area.

The security-main interface 330 may be connected to the security main interconnection. The security-main interface 330 together with the security main interconnection may be used when the security core 222 accesses the main core. In this case, the main core may have a more restricted access to the area of the security core 222 than the access of the security core 222 to the area of the main core. With this asymmetry, the security of the security core 222 may be strengthened, and accordingly, the confidentiality of data can be maintained, and the system may be prepared for the risk of tampering. According to some embodiments, in order to implement this configuration more effectively, the main-security interface 320 and the security-main interface 330 may be physically separated from each other.

Figure 4:
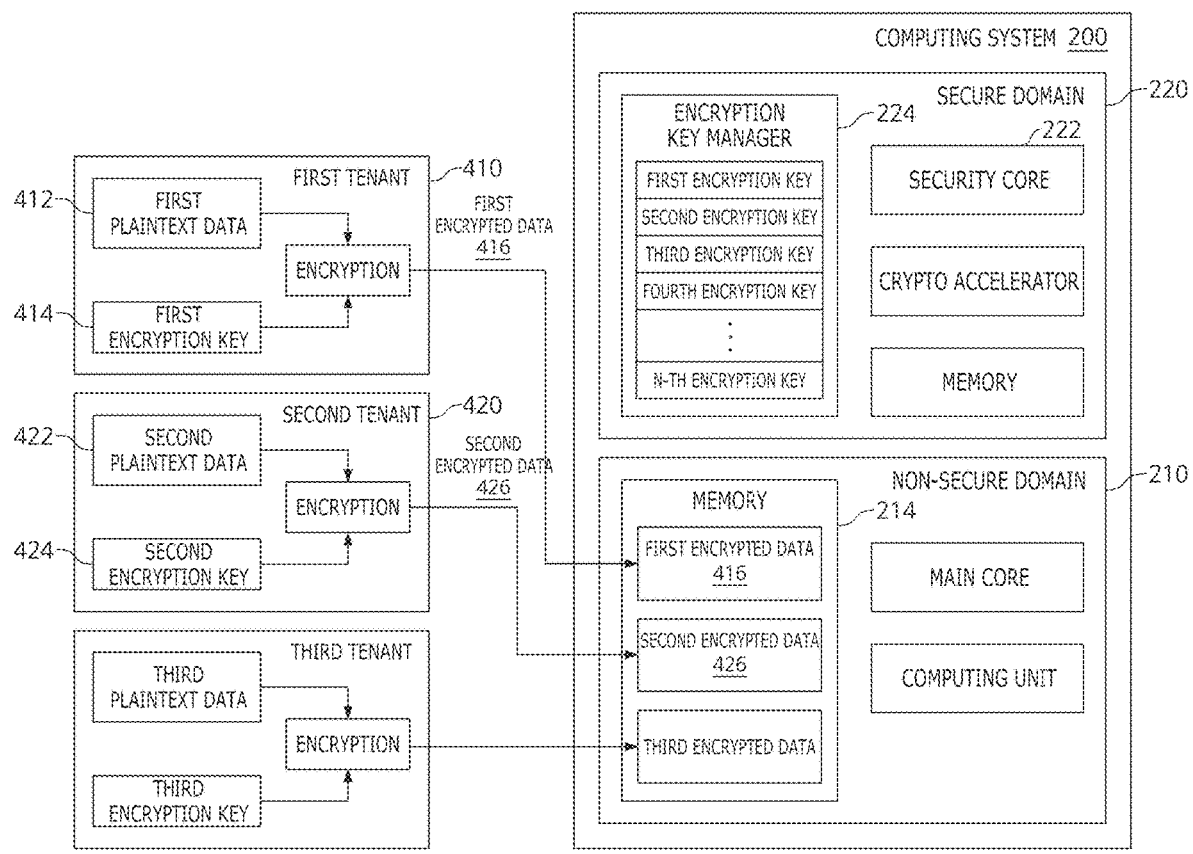
FIG. 4 is a diagram illustrating an example in which a computing system stores data received from a plurality of devices associated with each of a plurality of tenants in a memory.

FIG. 4 is a diagram illustrating an example in which the computing system 200 stores, in the memory 214, data received from a plurality of devices associated with each of a plurality of tenants 410 and 420. According to some embodiments, in order to maintain the confidentiality of data in the multi-tenant environment, the computing system 200 may encrypt the data before transmitting the data to a device associated with the tenant. Likewise, if the device associated with the tenant transmits data to the computing system 200, the data may be subject to encryption before being transmitted. To this end, a separate secure channel may be formed in advance between the computing system 200 and the device associated with each tenant, and the security core 222 may transmit an encryption key to the device associated with each tenant through the separate secure channel by using an encryption key exchange algorithm (e.g., ECDH algorithm). Information on the encryption key used by the computing system 200 to perform encryption and/or decryption may be managed by the encryption key manager 224 in the secure domain 220. In FIG. 4, the encryption key manager 224 is illustrated as a separate component from the security core 222, but this is for convenience of explanation only, and aspects of the present disclosure are not limited thereto. For example, at least some components of the encryption key manager 224 may be included in the security core 222.

According to some embodiments, the security core 222 may perform encryption or decryption using a bidirectional encryption algorithm to maintain confidentiality of data of each tenant or each user. For example, any bidirectional encryption algorithm known in the art, such as a symmetric key encryption algorithm such as AES or SEED or an asymmetric key encryption algorithm such as RSA or DSA, may be used. However, in the following description, for convenience of explanation, it is assumed that the security core 222 maintains confidentiality of data using the symmetric key encryption algorithm.

The security core 222 may transmit a first encryption key 414 to a device associated with the first tenant 410 through a separate secure channel. The device associated with the first tenant 410 may encrypt the first plaintext data 412 using the first encryption key 414 provided through the separate secure channel, and generate the first encrypted data 416. The device associated with the first tenant 410 may transmit the generated first encrypted data 416 to the computing system 200. The computing system 200 may store the first encrypted data 416 received from the device associated with the first tenant 410 in the memory 214 in the non-secure domain 210 as is, for example, in the encrypted form without decryption. As described above, the computing system 200 may store the encrypted data received from the device associated with the tenant in the memory 214 in the encrypted form instead of storing the encrypted data in the memory 214 in the form that is decrypted into the plaintext, thereby maintaining the confidentiality of data.

According to some embodiments, the security core 222 may designate and manage the encryption keys associated with each of the plurality of tenants as the encryption keys being different from each other, thereby maintaining the confidentiality of data of each tenant. For example, the security core 222 may transmit a second encryption key 424 to a device associated with the second tenant 420 through a separate secure channel. As described above, the security core 222 may transmit the second encryption key 424 through a different (or separate) secure channel than the secure channel through which the security core 222 transmit the first encryption key 414. The device associated with the second tenant 420 may encrypt a second plaintext data 422 using the second encryption key 424 provided through the separate secure channel, and generate the second encrypted data 426. The device associated with the second tenant 420 may transmit the generated second encrypted data 426 to the computing system 200. The computing system 200 may store the second encrypted data 426 received from the device associated with the second tenant 420 in the memory 214 in the non-secure domain 210 as is, for example, in the encrypted form without decryption.

According to some embodiments, in the memory 214 in the non-secure domain 210, the data associated with each tenant may be stored in the encrypted form using different encryption keys from each other. Therefore, even if the device associated with the second tenant 420 accesses the first encrypted data 416 stored in the memory 214, since the encryption keys are different from each other, access to the first plaintext data 412 in decrypted form is not allowed. With this configuration, the confidentiality of data associated with each tenant may be maintained.

According to some embodiments, the data in the encrypted form stored in the memory 214 in the non-secure domain 210 may be decrypted immediately before it is processed by the main core, and provided to the main core. This will be described below in detail with reference to FIG. 6.

Although the confidential computing between three tenants and the computing system 200 are described herein, aspects of the present disclosure are not limited thereto, and confidential computing between two or fewer, or four or more tenants and the computing system 200 may also be performed.

Figure 5:
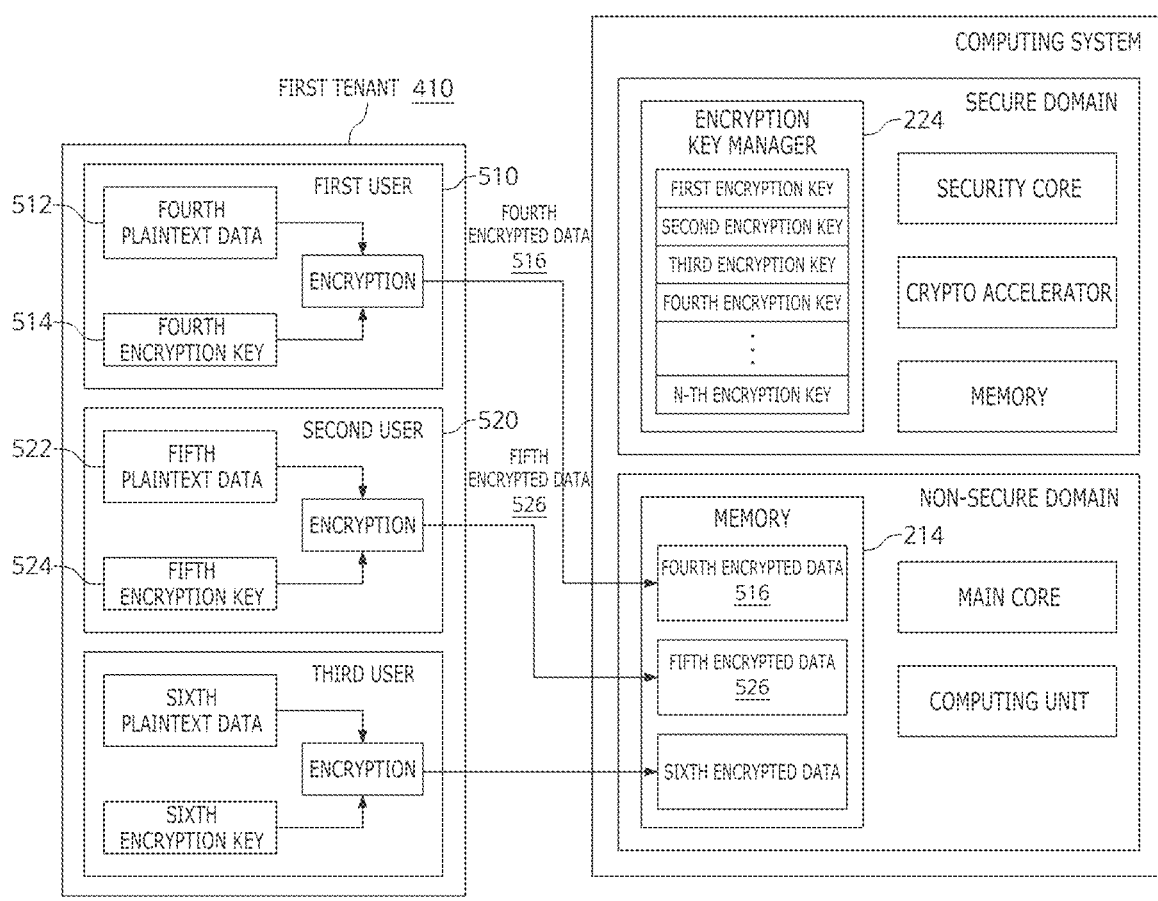
FIG. 5 is a diagram illustrating an example in which a computing system stores data received from a plurality of devices associated with each of a plurality of users belonging to the same tenant in a memory.

FIG. 5 is a diagram illustrating an example in which the computing system stores data received from a plurality of devices associated with each of a plurality of users 510 and 520 belonging to the same tenant in the memory 214. One tenant may include a plurality of users. It is necessary to maintain the confidentiality of data that includes sensitive information such as user personal information, even among a plurality of users belonging to the same tenant. Accordingly, the security core can designate and manage encryption keys associated with each of a plurality of users belonging to the same tenant as encryption keys different from each other, thereby maintaining the confidentiality of data of each user. The information on the encryption key associated with each of a plurality of users may be managed by the encryption key manager 224 in the secure domain.

For example, the first tenant 410 may include the first user 510, the second user 520, and a third user. The security core may transmit a fourth encryption key 514 to a device associated with the first user 510 through a separate secure channel. The device associated with the first user 510 may encrypt a fourth plaintext data 512 using the fourth encryption key 514 provided through the separate secure channel, and generate the fourth encrypted data 516. The device associated with the first user 510 may transmit the generated fourth encrypted data 516 to the computing system. The computing system may store the fourth encrypted data 516 received from the device associated with the first user 510 in the memory 214 in the non-secure domain as is, for example, in the encrypted form without decryption.

Likewise, the security core may transmit a fifth encryption key 524 to the device associated with the second user 520 through a separate secure channel. The device associated with the second user 520 may encrypt a fifth plaintext data 522 using the fifth encryption key 524 provided through the separate secure channel, and generate fifth encrypted data 526. The device associated with the second user 520 may transmit the generated fifth encrypted data 526 to the computing system. The computing system may store the fifth encrypted data 526 received from the device associated with the second user 520 in the memory 214 in the non-secure domain as is, for example, in the encrypted form without decryption.

According to some embodiments, the system may provide separate secure channels for the different users of the same tenant. In this case, the security core may transmit an encryption key to a device associated with a user through the separate secure channel provided for that user.

In the memory 214 in the non-secure domain, the data associated with each user may be stored in the encrypted form using different encryption keys from each other. Therefore, even if the device associated with the second user 520 accesses the fourth encrypted data 516 stored in the memory 214, since the encryption keys are different from each other, access to the fourth plaintext data 512 in decrypted form is not allowed. Accordingly, the confidentiality of data associated with each user can be maintained.

Although it is illustrated herein that three users are included in one tenant, aspects are not limited thereto, and two or fewer users or four or more users may be included in one tenant.

Figure 6:
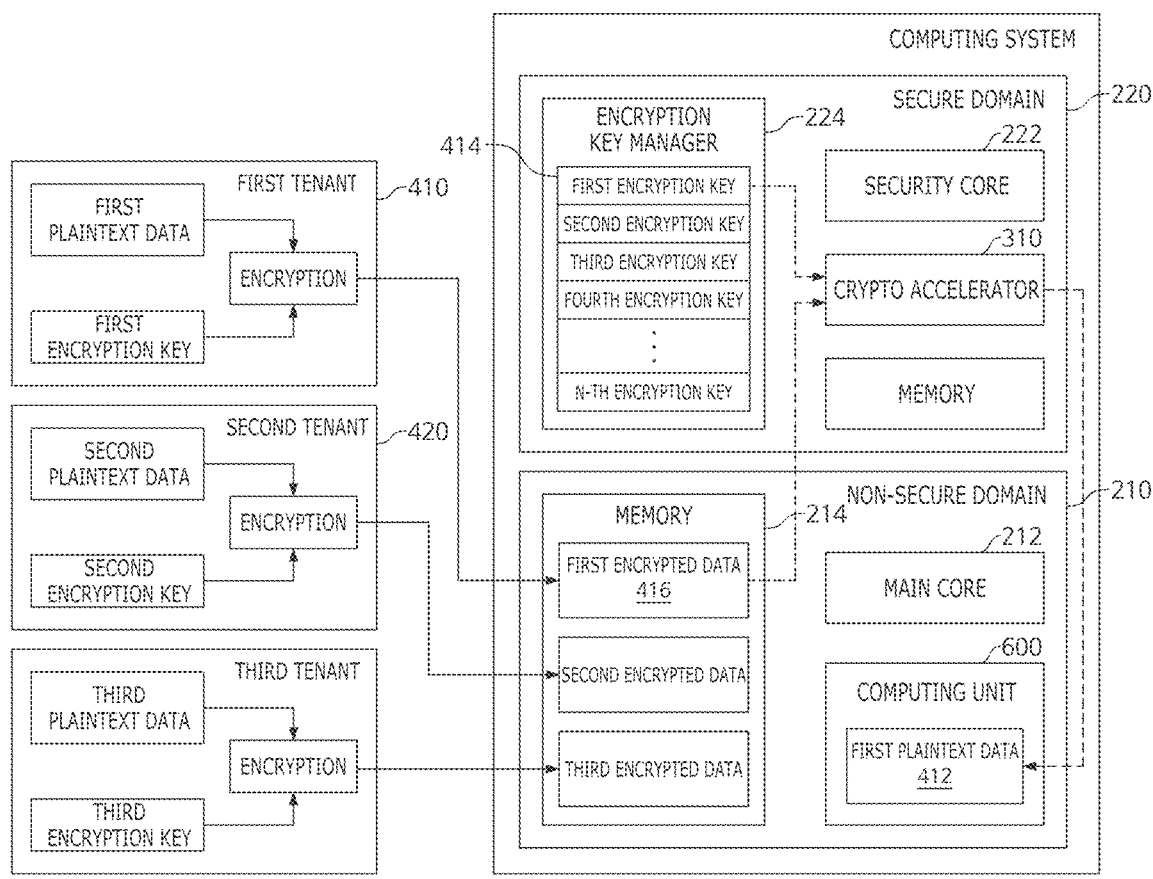
FIG. 6 is a diagram illustrating an example in which a security core decrypts encrypted data and provides the decrypted data to a main core.

FIG. 6 is a diagram illustrating an example in which the security core 222 decrypts encrypted data and provides the decrypted data to the main core 212. The computing system may store data associated with a tenant in an encrypted form in the memory 214 in the non-secure domain 210 to maintain the confidentiality of the data. According to some embodiments, the data in the encrypted form stored in the memory 214 in the non-secure domain 210 may be decrypted before the data is processed by the main core 212, or provided to the main core 212. For confidentiality, decryption may be performed in the secure domain 220 by the security core 222. For example, the security core 222 may perform decryption using the crypto accelerator 310 which is hardware specialized for crypto operations. According to some embodiments, the data in the encrypted form stored in the memory 214 may be decrypted immediately before it is provided to the main core 212. According to some embodiments, the data in the encrypted form stored in the memory 214 may be decrypted immediately before it is processed by the main core 212.

In FIG. 6, the crypto accelerator 310 is illustrated as a separate component from the security core 222, but this is for convenience of explanation only, and aspects of the present disclosure are not limited thereto. The crypto accelerator 310 may be included in the security core 222. Likewise, in FIG. 6, a computing unit 600 is illustrated as a separate component from the main core 212, but this is for convenience of explanation only, and aspects of the present disclosure are not limited thereto. In this case, the computing unit 600 may operate under the management of the main core 212. Additionally or alternatively, the computing unit 600 may be included in the main core 212.

According to some embodiments, the security core 222 may receive a request to access the first plaintext data 412

(e.g., a request for computation of the first plaintext data 412). The security core 222 may generate the first plaintext data 412 based on the first encrypted data 416 and the first encryption key 414 using the crypto accelerator 310.

According to some embodiments, the security core 222 may check whether an external device requesting access has an authorized access before decrypting the first encrypted data 416 and generating the first plaintext data 412. For example, if the request to access is received from the device associated with the second tenant 420 having no authorized access to the first plaintext data 412, the security core 222 may reject access to the first plaintext data 412. The process of checking whether the security core 222 has an authorized access to the first plaintext data 412 of the external device will be described below in detail with reference to FIG. 8.

The security core 222 may provide the first plaintext data 412 to the main core 212. For example, the security core 222 may provide the first plaintext data 412 to the computing unit 600 of the main core 212. The computing unit 600 of the main core 212 may performed the requested processing (e.g., computation) on the provided first plaintext data 412.

The main core 212 (e.g., the computing unit 600 of the main core 212) may generate a result of processing the first plaintext data 412. The security core 222 may perform encryption on the generated result of processing using the first encryption key 414 associated with the first tenant 410, and transmit the result to the device associated with the first tenant 410.

Figure 7:
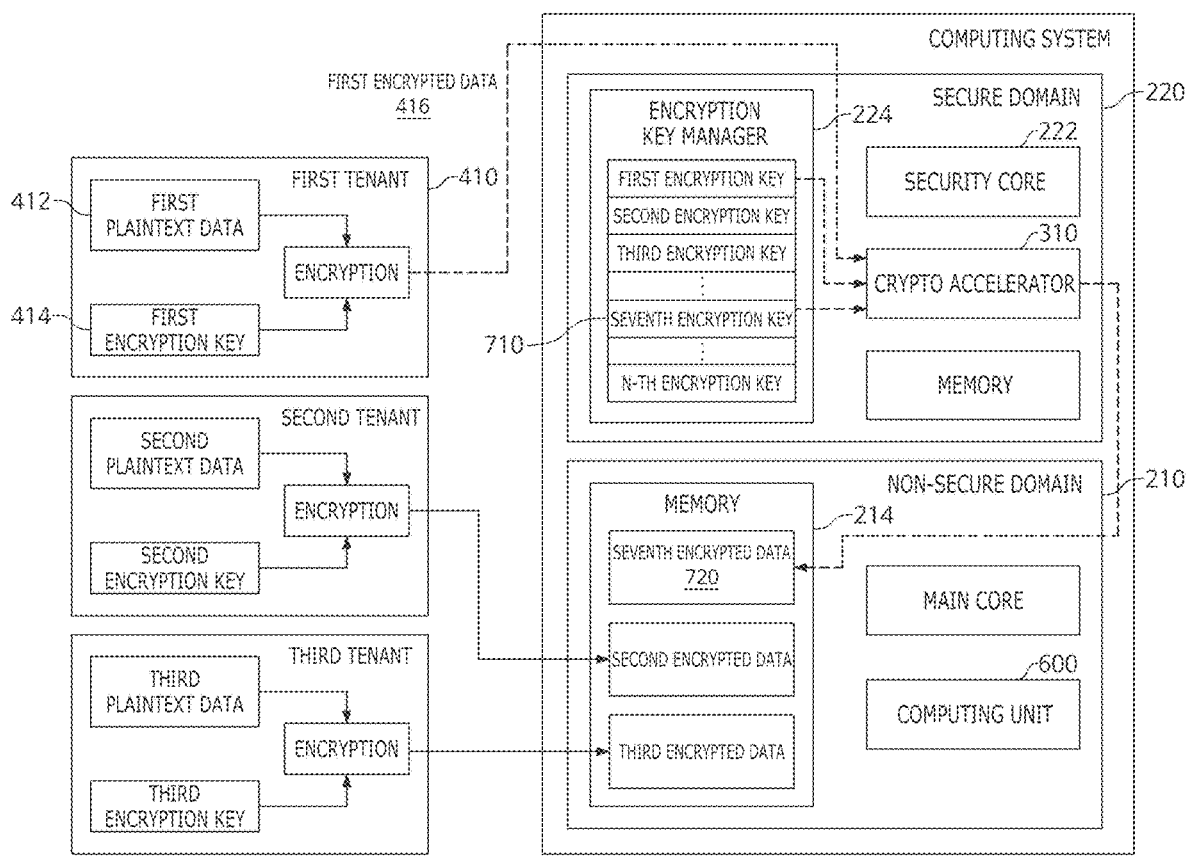
FIG. 7 is a diagram illustrating an example in which the security core encrypts received data with a new encryption key and stores the encrypted data in a memory.

FIG. 7 is a diagram illustrating an example in which the security core 222 encrypts received data with a new encryption key and stores the encrypted data in the memory 214. According to the example described above with reference to FIG. 5, the computing system stores the encrypted data received from the device associated with the first tenant 410 in the memory 214 as is. In this case, if the first encryption key 414 managed by the device associated with the first tenant 410 is exposed to a malicious attack, it is likely that the data stored in the memory 214 of the computing system is also exposed.

According to some embodiments, in order to avoid the risk of exposing the encryption key, instead of storing the received data as is in the memory, the security core 222 may encrypt the data received from the device associated with the first tenant 410 using a new encryption key and store the encrypted data in the memory 214.

For example, the security core 222 may receive the first encrypted data 416 from the device associated with the first tenant 410. In this case, the first encrypted data 416 may be the first plaintext data 412 encrypted using the first encryption key 414. The security core 222 may decrypt the first encrypted data 416 based on the first encryption key 414 using the crypto accelerator 310 to generate the first plaintext data 412. The security core 222 may designate or determine, for example, a seventh encryption key 710 managed by the encryption key manager 224 in the secure domain 220 as a new encryption key. The security core 222 may perform encryption based on the first plaintext data 412 and the seventh encryption key 710 using the crypto accelerator 310 to generate the seventh encrypted data 720. In this way, the seventh encrypted data 720 may be stored in the memory 214 in the non-secure domain 210.

The seventh encrypted data 720 stored in the memory 214 in the non-secure domain 210 may be decrypted before the data is processed by the main core 212 (e.g., the computing unit 600 of the main core 212, and the like), or provided to the main core 212. According to some embodiments, the data 720 stored in the memory 214 may be decrypted immediately before it is provided to or processed by the main core 212.

According to some embodiments, the data generated as a result of processing the first plaintext data 412 by the main core 212 may be encrypted by the security core 222 and transmitted to the device associated with the first tenant 410. The security core 222 may encrypt the data generated as a result of processing using the first encryption key 414 previously managed by a device associated with the first tenant 410, and transmit the data to the device associated with the first tenant 410. According to some embodiments, the security core 222 may transmit the newly designated seventh encryption key 710 to the device associated with the first tenant 410 through a separate secure channel. The security core 222 may encrypt the data generated as a result of processing using the seventh encryption key 710, and transmit the encrypted data to the device associated with the first tenant 410.

Figure 8:
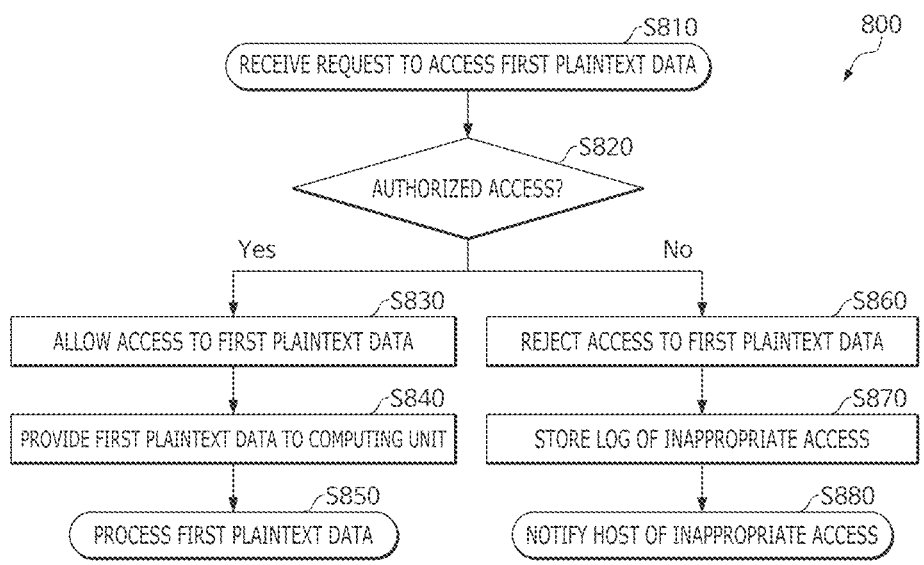
FIG. 8 is a diagram illustrating an example of a process of checking for an authorized access.

FIG. 8 is a diagram illustrating an example of a process 800 of checking for an authorized access. According to some embodiments, the security core may receive a request to access the first plaintext data, at S810, and check whether the external device that requested the access has an authorized access, at S820.

If the authorized access of the external device that requested the access to the first plaintext data is confirmed, the security core may allow access to the first plaintext data, at S830. The security core may perform decryption on the first encrypted data to generate first plaintext data, and provide the first plaintext data to the computing unit of the main core for processing of the generated first plaintext data, at S840. The processing of the first plaintext data may be performed by the computing unit of the main core, at S850. In this case, the computing unit may be operated under the management of the main core or included in the main core.

If the authorized access of the external device that requested the access to the first plaintext data is not confirmed, the security core may reject access to the first plaintext data, at S860. In addition, the security core may store a log of an inappropriate request to access from an external device, at S870 and generate an interrupt to notify the host of the inappropriate access, at S880.

Figure 9:
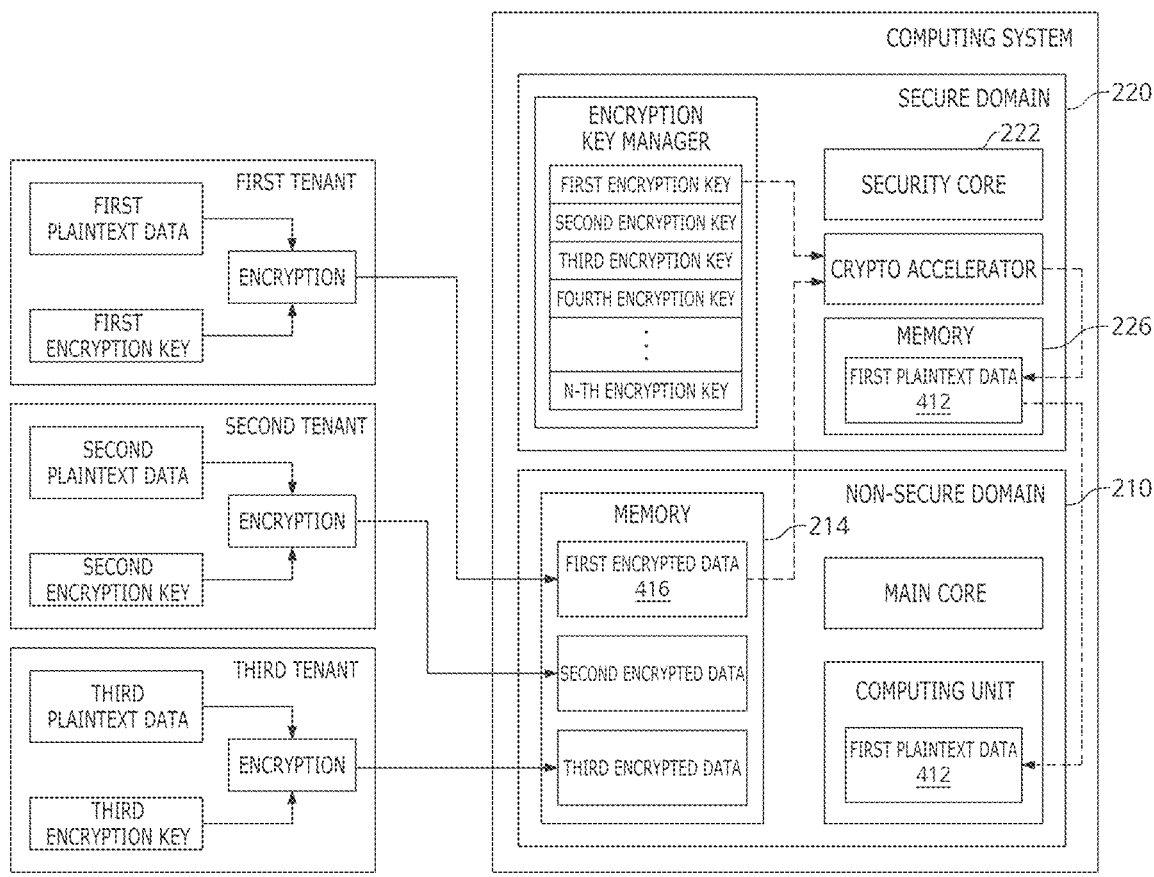
FIG. 9 is a diagram illustrating an example in which a security core stores plaintext data in a memory.

FIG. 9 is a diagram illustrating an example in which the security core 222 stores plaintext data in the memories 214 and 226. If the first plaintext data 412 is repeatedly used by the main core, since the security core 222 repeatedly decrypts the first encrypted data 416 every time the first plaintext data 412 is used, the efficiency of data processing may decrease. Accordingly, according to some embodiments, if it is determined that the first plaintext data 412 decrypted by the security core 222 is data that may be reused later, the security core 222 may store the decrypted first plaintext data 412 in the memories 214 and 226. In this case, the memories 214 and 226 may be the memory 214 in the non-secure domain 210 and/or the memory 226 in the secure domain 220.

The memory 214 in the non-secure domain 210 may be accessible by the main core and the security core 222, but the memory 226 in the secure domain 220 may be accessible only by the security core 222. With this configuration, the security core 222 may determine a memory in which the first plaintext data 412 is stored according to the security level of the first plaintext data 412. The security level of the first plaintext data 412 may be determined based on the type of the first plaintext data 412 and/or user settings, and the like.

For example, if the first plaintext data 412 includes sensitive information such as a face image of a user or medical information of a user, the security level may be determined to be relatively high, and accordingly, the corresponding information may be stored in the memory 226 in the secure domain 220. As another example, if the first plaintext data 412 is system data (e.g., data associated with firmware, and the like) or a parameter of a machine learning model (e.g., kernel data having a large capacity), the security level thereof may be determined to be relatively low, and accordingly, the corresponding information may be stored in the memory 214 in the non-secure domain 210.

If receiving a request to access the first plaintext data 412 stored in the memories 214 and 226, prior to providing the first plaintext data 412, the security core 222 may check whether the external device requesting the access has an authorized access to the first plaintext data 412. A process of checking for authorized access may be performed in the same or similar manner to the process described above with reference to FIG. 8.

If the first plaintext data 412 is stored in the memory 214 in the non-secure domain 210, the first plaintext data 412 may be exposed to a malicious attack. According to some embodiments, the security core 222 may perform a runtime integrity check on the first plaintext data 412 stored in the memory 214 in the non-secure domain 210. This will be described below in detail with reference to FIG. 10.

Additionally, the security core 222 may receive a signal indicating that the use of the first plaintext data 412 stored in the memories 214 and 226 is finished. In this case, the security core 222 may store a pre-specified value (e.g., 0) in the area in the memories 214 and 226 in which the first plaintext data 412 is stored, thereby removing the risk of exposure of data.

Figure 10:
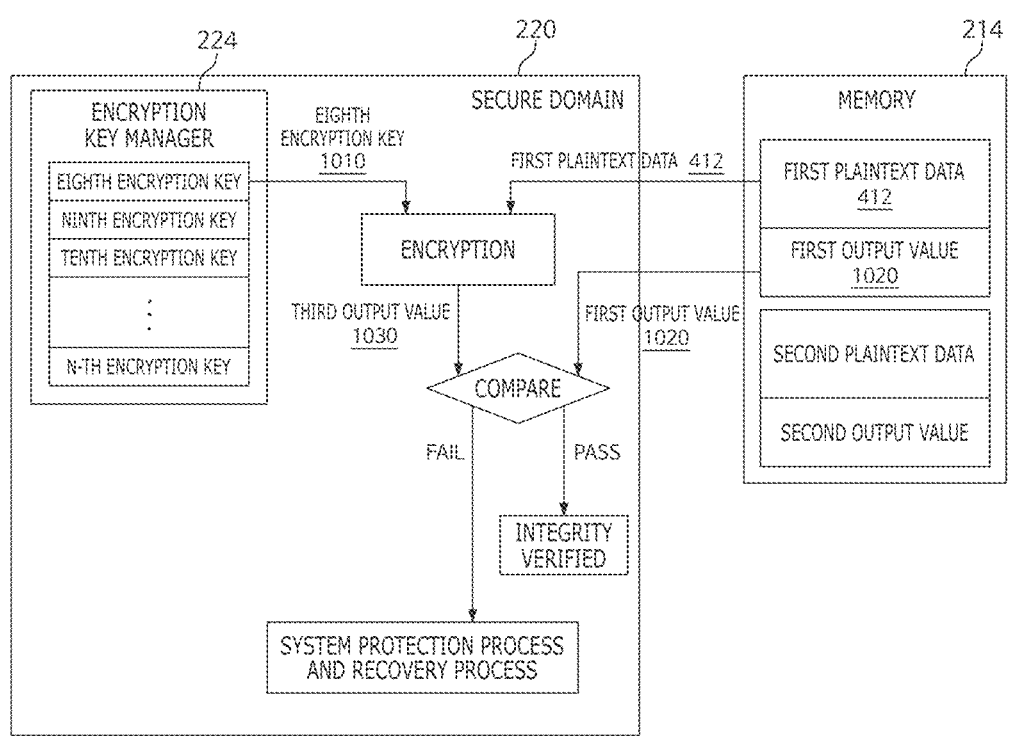
FIG. 10 is a diagram illustrating an example in which a security core performs a runtime integrity check.

FIG. 10 is a diagram illustrating an example in which a security core performs a runtime integrity check. If the plaintext data is stored in the memory 214 in the non-secure domain, the plaintext data may be exposed to malicious attacks. According to some embodiments, when storing the plaintext data in the memory 214 in the non-secure domain, the security core may store an encryption algorithm output value for the plaintext data together with the plaintext data, and perform an integrity check on the plaintext data using the plaintext data and the encryption algorithm output value.

According to some embodiments, the security core may use a one-way encryption algorithm for the integrity check. The one-way encryption algorithm may be an algorithm which ensures that an output value is changed when an input value is changed, and for which it is very difficult or impossible to do an inverse operation to derive the input value from the output value. Any of the known one-way encryption algorithms may be used for the integrity check. For example, the one-way encryption algorithm may include hash algorithms such as CRC, MD5, RIPEMD160, SHA-1, SHA-256, and SHA-512, but is not limited thereto. Hereinafter, "output value" may refer to an output value of an encryption algorithm output in response to inputting plaintext data and an encryption key to the one-way encryption algorithm.

For example, the security core may generate a first output value 1020 based on the first plaintext data 412 and an eighth encryption key 1010 using a one-way encryption algorithm. As a specific example, the first output value 1020 may be a hash value output in response to the security core inputting the first plaintext data 412 and the eighth encryption key 1010 to a hash algorithm. The first output value 1020 may be stored in the memory 214 in association with the first plaintext data 412. The encryption key used for integrity check may be managed by the encryption key manager 224 in the secure domain 220 accessible by the security core.

The security core may periodically or non-periodically perform the integrity check on the first plaintext data 412 stored in the memory 214. For example, the security core may generate a third output value 1030 for the first plaintext data 412 based on the first plaintext data 412 and the eighth encryption key 1010 using a one-way encryption algorithm. The security core may compare the stored first output value 1020 with the generated third output value 1030 to check for possible tampering of the first plaintext data 412 stored in the memory 214.

According to some embodiments, if it is determined that the first output value 1020 and the third output value 1030 do not match with each other as a result of checking for possible tampering, the first plaintext data 412 stored in the memory 214 may be determined to have been tampered with. If it is determined that the first plaintext data 412 has been tampered with, the security core may perform a system protection process and a recovery process. A method for performing the system protection process and the recovery process by the security core will be described below in detail with reference to FIGS. 11 and 12. If the first output value 1020 and the third output value 1030 match with each other, the integrity of the first plaintext data 412 stored in the memory 214 may be verified.

If the same key is continuously used for integrity check, there is a possibility of exposure to security risks. In order to prevent the exposure to security risks, the security core may periodically or non-periodically change the encryption key and regenerate and store an output value. For example, the security core may generate, by using a one-way encryption algorithm, a new output value based on the first plaintext data 412 and the ninth encryption key managed by the encryption key manager 224, and store the new output value in the memory 214 in association with the first plaintext data 412.

Figure 11:
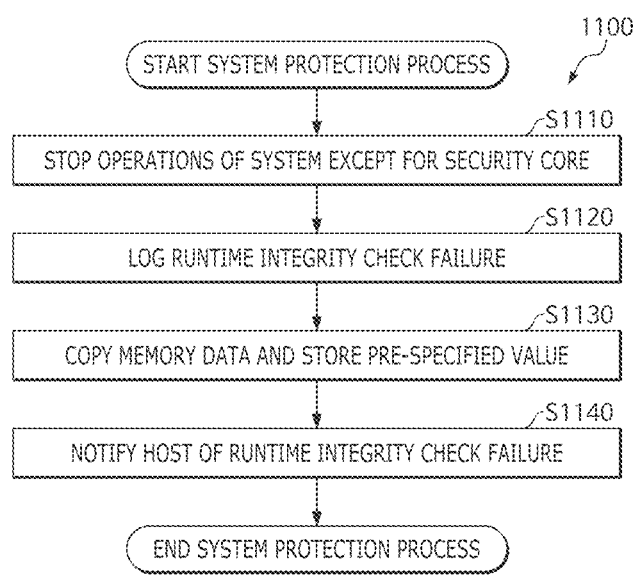
FIG. 11 is a diagram illustrating an example of a system protection process.

FIG. 11 is a diagram illustrating an example of a system protection process 1100. According to some embodiments, if it is determined as a result of the runtime integrity check that the first plaintext data stored in the memory in the non-secure domain has been tampered with, the security core may start the system protection process 1100 by immediately stopping the operation of the entire system including the main core, at S1110. The main core may maintain an operation suspension state (wait for interrupt) until an operation resume command is received from the security core. During this process, the operation of the security core may not be stopped.

The security core may record a log indicating that the runtime integrity check fails, at S1120. For example, the security core may store log information necessary for analyzing a problem situation, in a memory (memory accessible only by the security core) in the secure domain.

The security core may copy the data of the memory in the non-secure domain and/or store (rewrite) a predetermined value in the main memory, at S1130. For example, the security core may store the entire area of the memory in the non-secure domain or the area of the memory in the non-secure domain associated with the first plaintext data for which tampering is detected, as a predetermined value (e.g., 0). Before storing a pre-specified value in the entire area of the memory in the non-secure domain, the security core may copy the data of the area of the memory in the non-secure domain, excluding the area associated with the first plaintext data for which tampering is detected, to a pre-designated area of a separate memory accessible by the security core.

The security core may end the system protection process by notifying the host of the failure of the runtime integrity check, using an interrupt, at S1140. The security core may perform a recovery process for restarting the system.

Figure 12:
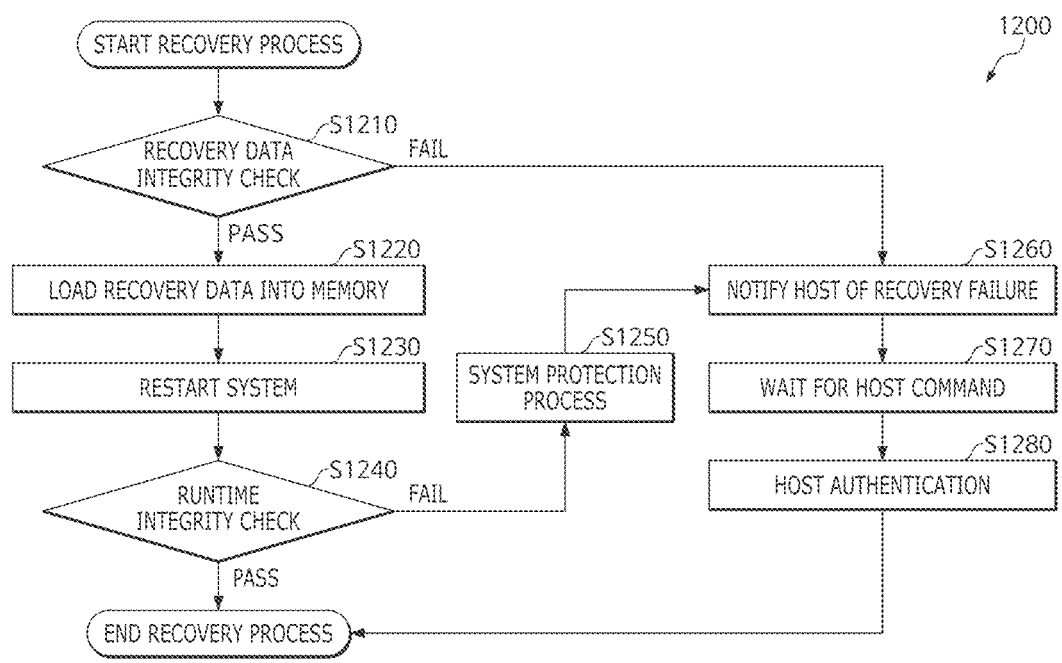
FIG. 12 illustrates an example of a recovery process.

FIG. 12 illustrates an example of a recovery process 1200. According to some embodiments, the security core may perform the recovery process 1200 for restarting the system after performing the system protection process 1100 described above. According to some embodiments, at least part of the system protection process 1100 and at least part of the recovery process 1200 may be performed in parallel.

First, the security core may check the integrity of the recovery data, at S1210. For example, the security core may determine possible tampering of the recovery data based on reliable recovery data (e.g., firmware, page table, and the like) stored separately in a non-volatile memory accessible by the security core and output values (e.g., hash values) stored in association with the recovery data. Determining the possible tampering may be performed in the same or similar manner to the integrity check process described above with reference to FIG. 10.

If it is determined as a result of S1210 that the recovery data has not been tampered with, the security core may load the recovery data into the memory in the non-secure domain, at S1220, and restart the operation of the main core, at S1230. For example, the security core may store the recovery data in an area of the memory in the non-secure domain different from an area associated with the first plaintext data for which tampering is detected.

After the system is restarted, the security core may perform the integrity check process described above with reference to FIG. 10 temporarily, periodically, non-periodically, and/or for a pre-specified period, at S1240. If the result of the runtime integrity check reveals no abnormality, the recovery process may be ended. In contrast, if it is determined during the runtime integrity check process that at least some of the stored data of the memory in the non-secure domain has been tampered with, the security core may perform the system protection process described above again, at S1250.

If it is determined as a result of S1210 that the recovery data has been tampered with or, if the re-executing the system protection process of S1250 is completed, the security core may notify the host of the failure of recovery, for example, by using an interrupt at S1260 and wait for a command from the host at S1270.

According to some embodiments, if the security core detects that the host is accessing the system while waiting to receive the command from the host, the security core may authenticate the access of the host to the system by assuming that the host is subjected to a malicious attack. For example, the authentication process may be performed using an encryption key associated with a host managed by the encryption key manager. In addition, for confidentiality, the authentication may be performed using a bi-directional encryption algorithm (e.g., symmetric key encryption algorithms such as AES and SEED or asymmetric key encryption algorithms such as RSA and DSA).

Figure 13:
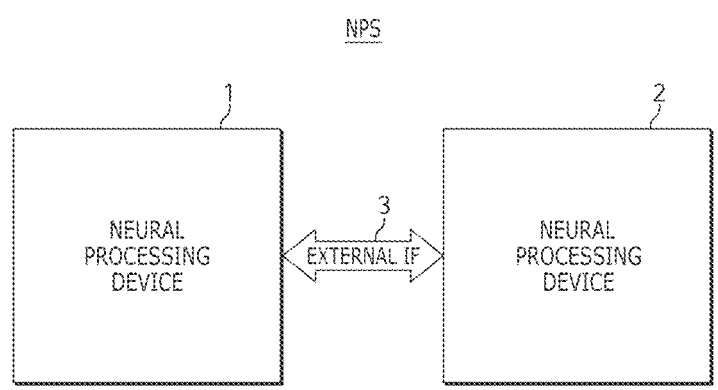
FIG. 13 is a block diagram provided to explain an example of a neural processing system.

FIG. 13 is a block diagram provided to explain an example neural processing system. Referring to FIG. 13, a neural processing system (NPS) may include a first neural processing device 1, a second neural processing device 2, and an external interface 3.

The first neural processing device 1 may be a device that performs computations using an artificial neural network.

The first neural processing device 1 may be a device specialized for performing a deep learning computational task, for example. However, aspects are not limited to the above.

The second neural processing device 2 may have a configuration identical or similar to that of the first neural processing device 1. The first neural processing device 1 and the second neural processing device 2 may be connected to each other through the external interface 3 to share data and control signals.

Although FIG. 13 illustrates two neural processing devices, the neural processing system (NPS) is not limited thereto. For example, in the neural processing system (NPS), three or more neural processing devices may be connected to each other through the external interface 3. In addition, conversely, a neural processing system (NPS) may include only one neural processing device.

In this case, each of the first neural processing device 1 and the second neural processing device 2 may be a processing device other than the neural processing device. For example, the first neural processing device 1 and the second neural processing device 2 may be a graphics processing unit (GPU), a central processing unit (CPU), or other types of processing devices, respectively. Hereinafter, for convenience, the first neural processing device 1 and the second neural processing device 2 will be described as neural processing devices.

Figure 14:
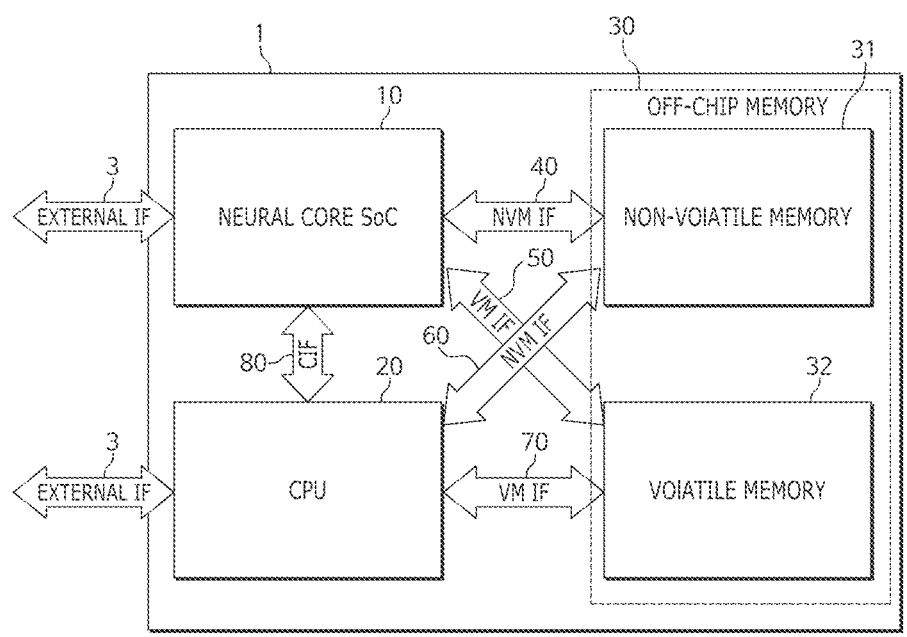
FIG. 14 is a block diagram provided to explain the example neural processing device of FIG. 13 in detail.

FIG. 14 is an example block diagram provided to explain the example neural processing device of FIG. 13 in detail. Referring to FIG. 14, the first neural processing device 1 may include a neural core SoC 10, a CPU 20, an off-chip memory 30, a first non-volatile memory interface 40, a first volatile memory interface 50, a second non-volatile memory interface 60, a second volatile memory interface 70, and a control interface (CIF) 80.

The neural core SoC 10 may be a System on Chip device. The neural core SoC 10 may be an artificial intelligence computing unit and may be an accelerator. The neural core SoC 10 may be any one of a graphics processing unit (GPU), a field programmable gate array (FPGA), or an application-specific integrated circuit (ASIC), for example. However, aspects of the present disclosure are not limited to the above.

The neural core SoC 10 may exchange data with other external computing units through the external interface 3. In addition, the neural core SoC 10 may be connected to a non-volatile memory 31 and a volatile memory 32 through the first non-volatile memory interface 40 and the first volatile memory interface 50, respectively.

The CPU 20 may be a controller that controls the system of the first neural processing device 1 and executes the program operations. The CPU 20 may be a general-purpose computing unit and may have too low efficiency to perform parallel simple computations widely used in deep learning. Accordingly, the neural core SoC 10 may perform computations for deep learning reasoning and learning tasks, thus achieving high efficiency.

The CPU 20 may exchange data with other external computing units through the external interface 3. In addition, the CPU 20 may be connected to the non-volatile memory 31 and the volatile memory 32 through the second non-volatile memory interface 60 and the second volatile memory interface 70, respectively.

The CPU 20 may also pass a task to the neural core SoC 10 in a command. In this case, the CPU 20 may be a kind of host that gives instructions to the neural core SoC 10. For Example, the neural core SoC 10 may efficiently perform parallel computational tasks such as deep learning tasks according to instructions of the CPU 20.

In addition, the CPU 20 may receive a command or task from an external host, and control the first neural processing device 1 based on the received command or task and execute the program operations. In addition, the CPU 20 may also control a neural processing device other than the first neural processing device 1 including the CPU 20 and execute the program operations.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVE-PROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, and 3D XPoint memory. However, aspects of the present disclosure are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, each of the first non-volatile memory interface 40 and the second non-volatile memory interface 60 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects of the present disclosure are not limited to the above.

For example, each of first volatile memory interface 50 and the second volatile memory interface 70 may be at least one of a Single Data Rate (SDR), a Double Data Rate (DDR), a Quad Data Rate (QDR), an eXtreme Data Rate (XDR), and an octal data rate (ODR). However, aspects of the present disclosure are not limited to the above.

The control interface 80 may be an interface for delivering control signals between the CPU 20 and the neural core SoC 10. The control interface 80 may transmit a command of the CPU 20 and transmit a response of the neural core SoC 10 to the command. For example, the control interface 80 may be PCI Express (PCIe), but is not limited thereto.

Figure 15:
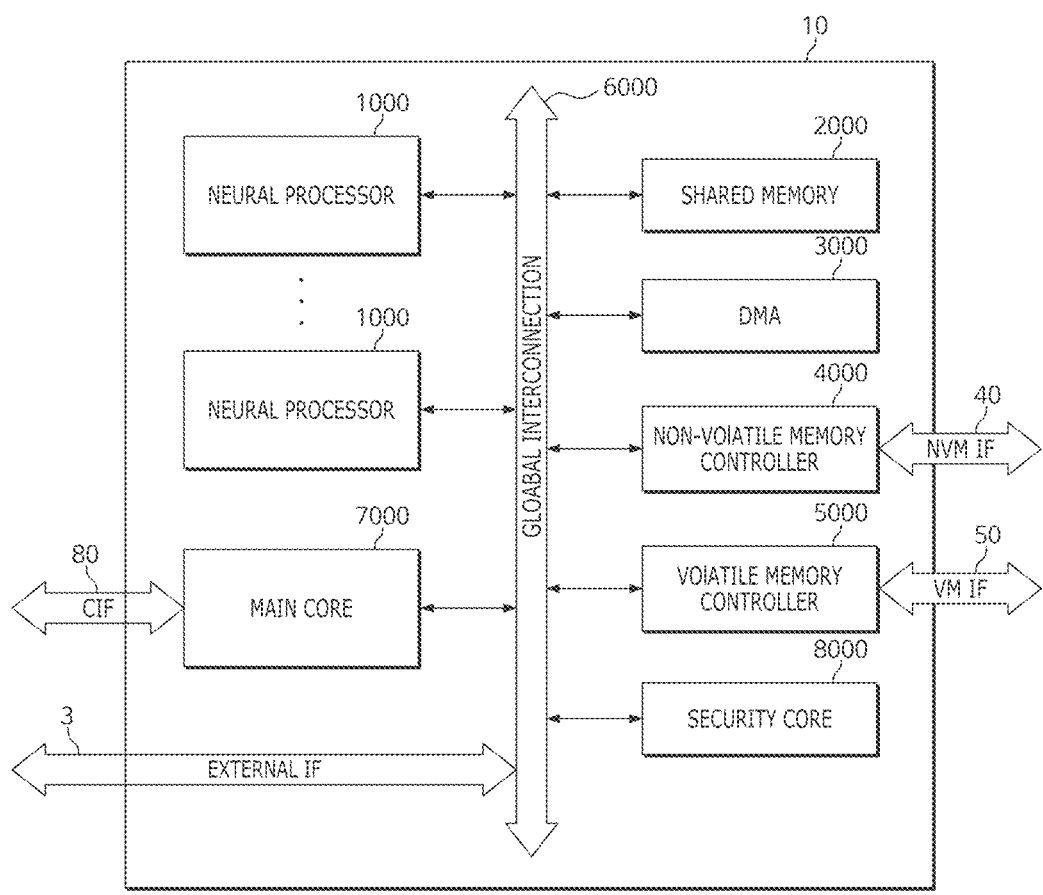
FIG. 15 is a block diagram provided to explain the example neural core SoC of FIG. 14 in detail.

FIG. 15 is an example block diagram provided to explain the example neural core SoC of FIG. 14 in detail. FIGS. 14 and 15, the neural core SoC 10 may include at least one neural processor 1000, a shared memory 2000, a Direct Memory Access (DMA) 3000, a non-volatile memory controller 4000, a volatile memory controller 5000, a main core 7000, a security core 8000, and a global interconnection 6000.

The neural processor 1000 may be a computing unit that directly performs computational tasks. If there are a plurality of neural processors 1000, the computational tasks may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 14.

The shared memory 2000 may require a relatively fast memory. Accordingly, the shared memory 2000 may include SRAM, for example. However, aspects of the present disclosure are not limited to the above. For example, the shared memory 2000 may include DRAM.

The shared memory 2000 may be a memory corresponding to an SoC level, for example, to level 2 (L2). Accordingly, the shared memory 2000 may be defined as the L2 shared memory.

The DMA 3000 may directly control data movement without requiring the CPU 20 or the neural processor 1000 to control input/output of data. Accordingly, the DMA 3000 may control the data movement between memories to minimize the number of interrupts of the CPU or neural processor 1000.

The DMA 3000 may control the data movement between the shared memory 2000 and the off-chip memory 30. The non-volatile memory controller 4000 and the volatile memory controller 5000 may perform the movement of data through the authority of the DMA 3000.

The non-volatile memory controller 4000 may control read or write operation of the non-volatile memory 31. The non-volatile memory controller 4000 may control the non-volatile memory 31 through the first non-volatile memory interface 40.

The volatile memory controller 5000 may control the read or write operation of the volatile memory 32. In addition, the volatile memory controller 5000 may perform a refresh operation of the volatile memory 32. The volatile memory controller 5000 may control the volatile memory 32 through the first volatile memory interface 50.

The main core 7000 may be connected to the control interface 80. The main core 7000 may receive a control signal from the CPU 20 through the control interface 80. The main core 7000 may generate a task through a control signal received from the CPU 20 and transmit the task to each neural processor 1000. In addition, the main core 7000 may receive a task completion report from each neural processor 1000. The main core 7000 may also be referred to as a command processor.

The global interconnection 6000 may connect at least one neural processor 1000, the shared memory 2000, the DMA 3000, the non-volatile memory controller 4000, the main core 7000, and the volatile memory controller 5000 to each other. In addition, the external interface 3 may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the main core 7000 and the external interface 3.

The global interconnection 6000 may transmit not only the data, but also control signals and signals for synchronization.

The security core 8000 may be a device for performing a method for confidential computing. The main core 7000 and the security core 8000 of FIG. 15 may correspond to the main core 212 and the security core 222 described above, respectively.

Figure 16:
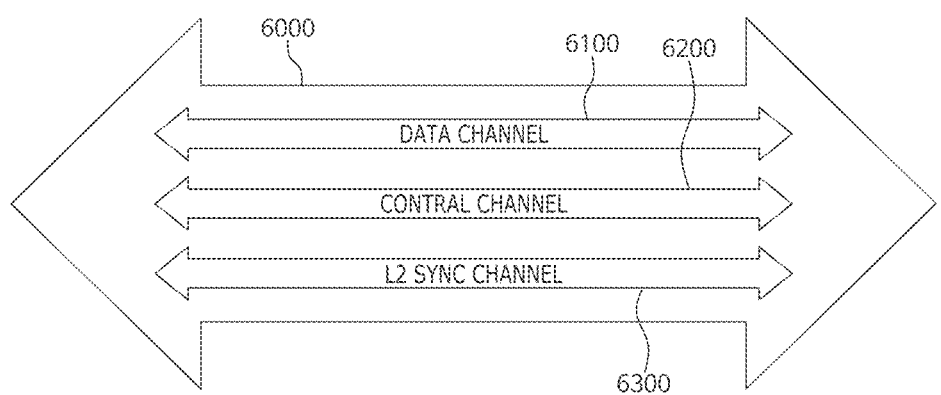
FIG. 16 is a structural diagram provided to explain the example global interconnection of FIG. 15 in detail.

FIG. 16 is an example structural diagram provided to explain the global interconnection of FIG. 15 in detail. Referring to FIG. 16, the global interconnection 6000 may include a data channel 6100, a control channel 6200, and an L2 sync channel 6300.

The data channel 6100 may be a dedicated channel for transmitting data. Through the data channel 6100, at least one neural processor 1000, the shared memory 2000, the DMA 3000, the non-volatile memory controller 4000, the volatile memory controller 5000, and the external interface 3 may exchange data with each other.

The control channel 6200 may be a dedicated channel for transmitting control signals. Through the control channel 6200, at least one neural processor 1000, the shared memory 2000, the DMA 3000, the non-volatile memory controller 4000, the volatile memory controller 5000, the main core 7000, and the external interface 3 may exchange control signals with each other. In particular, the main core 7000 may transmit various control signals to each of the neural processors 1000.

The L2 sync channel 6300 may be a dedicated channel for transmitting synchronization signals. Through the L2 sync channel 6300, at least one neural processor 1000, the shared memory 2000, the DMA 3000, the non-volatile memory controller 4000, the volatile memory controller 5000, the main core 7000, and the external interface 3 may exchange the synchronization signals with each other.

The L2 sync channel 6300 may be set as a dedicated channel inside the global interconnection 6000 so as to allow fast transmission of the synchronization signals without overlapping with other channels. Accordingly, the neural processing device may smoothly perform synchronization using the existing global interconnection 6000 without requiring new wiring work.

Figure 17:
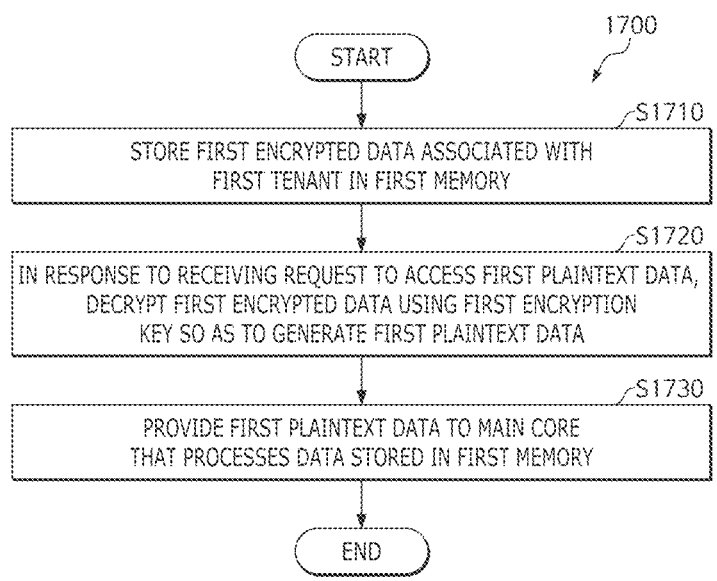
FIG. 17 is a flowchart illustrating an example of a method for confidential computing.

FIG. 17 is a flowchart illustrating an example of a method 1700 for confidential computing. According to some embodiments, the method 1700 may be performed by a security core including one or more processors. The security core may store the first encrypted data associated with the first tenant in the first memory, at S1710. In this case, the first encrypted data may be obtained by performing encryption of the first plaintext data using the first encryption key associated with the first tenant.

For example, the security core may receive the first encrypted data from the device associated with the first tenant and store the received data in the first memory as is. According to some embodiments, in order to prevent a risk of exposure of the encryption key, the security core may encrypt the data received from the device associated with the first tenant using a new encryption key and store the encrypted data in the first memory. For example, the security core may receive the fourth encrypted data from the device associated with the first tenant. In this case, the fourth encrypted data may be obtained by performing encryption of the first plaintext data using the third encryption key. The security core may decrypt the fourth encrypted data using the third encryption key to generate the first plaintext data, and the third encryption key may encrypt the first plaintext data using a different first encryption key as a new encryption key to generate first encrypted data. The security core may store the first encrypted data in the first memory.

Additionally, the security core may store second encrypted data associated with the second tenant in the first memory. In this case, the second encrypted data may be obtained by performing encryption of the second plaintext data using a second encryption key associated with the second tenant. In this case, the second encryption key associated with the second tenant may be different from the first encryption key associated with the first tenant.

The first encrypted data may be data associated with a first user belonging to the first tenant. The security core may manage data by using an encryption key different from the first encryption key for data associated with other users belonging to the first tenant. For example, the security core may store sixth encrypted data associated with the second user in the first memory. In this case, the sixth encrypted data may be obtained by performing encryption of the fourth plaintext data using the fourth encryption key, and the first encryption key and the fourth encryption key may be different from each other.

According to some embodiments, the security core may perform encryption and decryption of the data, using a crypto accelerator for acceleration of at least one of encryption and decryption.

According to some embodiments, in response to receiving a request to access the first plaintext data (e.g., a request for computation of the first plaintext data), the security core may generate the first plaintext data by decrypting the first encrypted data using the first encryption key, at S1720. The security core may check whether an external device requesting access has an authorized access, before decrypting the first encrypted data and generating the first plaintext data. The process in which the security core checks whether the external device has an authorized access to the first plaintext data may be performed as described above with reference to FIG. 8.

The security core may provide the first plaintext data to the main core that processes data stored in the first memory, at S1730. For example, the security core may provide the first plaintext data to the computing unit of the main core. The computing unit of the main core may perform the requested processing (e.g., computation) on the provided first plaintext data.

The main core (e.g., the computing unit of the main core) may generate third plaintext data as a result of processing the first plaintext data. The security core may encrypt the third plaintext data generated as a result of processing, and transmit the encrypted data to the device associated with the first tenant.

If the computing system receives data encrypted using the first encryption key from the first tenant and stores the received data as is in the first memory, the security core may also encrypt the generated third plaintext data using the first encryption key to generate third encrypted data. The third encrypted data may be transmitted to the device associated with the first tenant.

According to another example, the computing system may receive encrypted data using the third encryption key from the first tenant, decrypt the received data, encrypt the decrypted data with the first encryption key as a new encryption key, and store the encrypted data in the first memory. In this case, the security core may encrypt the third plaintext data using the first or third encryption key to generate third encrypted data or fifth encrypted data, and transmit the generated encrypted data to the device associated with the first tenant. When transmitting the third encrypted data encrypted using the first encryption key, which is the new encryption key, to the device associated with the first tenant, the security core may transmit a first encryption key, which is a new encryption key, to the device associated with the first tenant through a separately formed secure channel.

According to some embodiments, if it is possible to reuse the first plaintext data decrypted by the security core, the first plaintext data may be stored in a memory. In this case, the memory may be a first memory or a second memory accessible only by the security core and not accessible by the main core. The first plaintext data may be stored in the first memory or the second memory based on a security level of the first plaintext data. If the first plaintext data is stored in the memory, the security core may receive, from the external device, a request to access the first plaintext data stored in the memory, check whether the external device has authorized access to the first plaintext data, and then provide the first plaintext data.

Additionally, if the use of the first plaintext data stored in the memory is finished, the security core may store a pre-specified value in the area in which the first plaintext data is stored in the memory.

According to some embodiments, the method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A processing device, comprising:
a first memory;
a main core operably coupled to the first memory; and
a security core configured to:
store first encrypted data associated with a first tenant in the first memory, wherein the first encrypted data is obtained by performing encryption of first plaintext data using a first encryption key associated with the first tenant, wherein the first encryption key is stored in a second memory in a secure domain, wherein the second memory is configured to be accessible by the security core and is configured to be not accessible by the main core,
in response to receiving a request to access the first plaintext data, decrypt the first encrypted data stored in the first memory using the first encryption key to generate the first plaintext data;
provide the first plaintext data to the main core for processing by the main core;
determine that the first plaintext data will be reused at a later time; and
store, based on the determining, the first plaintext data for later use in a memory, wherein the memory is the first memory or the second memory.

2. The processing device of claim 1, wherein the processing device further includes a crypto accelerator for acceleration of at least one of encryption or decryption, wherein the crypto accelerator is accessible only by the security core,
wherein the security core is configured to perform at least one of encryption or decryption using the crypto accelerator.

3. The processing device of claim 1, wherein the first encryption key associated with the first tenant is different from a second encryption key associated with a second tenant, and
matching information between a plurality of tenants and a plurality of encryption keys is accessible only by the security core and not accessible by the main core.

4. The processing device of claim 1, wherein the first encryption key associated with the first tenant is an encryption key associated with a first user belonging to the first tenant, wherein the first tenant includes one or more users,
the first encryption key is different from a third encryption key associated with a second user belonging to the first tenant, and
matching information between a plurality of users and a plurality of encryption keys is accessible only by the security core and not accessible by the main core.

5. The processing device of claim 1, wherein the first encrypted data is data received from a device associated with the first tenant.

6. The processing device of claim 1, wherein the security core is further configured to:
receive a second plaintext data generated as a result of processing, by the main core, the first plaintext data; and
encrypt the second plaintext data using the first encryption key to generate second encrypted data, wherein the generated second encrypted data is transmitted to a device associated with the first tenant.

7. The processing device of claim 1, wherein the security core is further configured to:
prior to storing the first encrypted data associated with the first tenant in the first memory:
receive third encrypted data from a device associated with the first tenant;
decrypt the third encrypted data using a fourth encryption key to generate the first plaintext data, wherein the third encrypted data was previously obtained by performing encryption of the first plaintext data using the fourth encryption key; and
encrypt the first plaintext data using the first encryption key as a new encryption key to generate the first encrypted data,
wherein the first encryption key and fourth encryption key are different from each other.

8. The processing device of claim 7, wherein the security core is further configured to encrypt second plaintext data using the fourth encryption key to generate fourth encrypted data, wherein the second plaintext data is generated as a result of processing the first plaintext data by the main core, and
wherein the fourth encrypted data is transmitted to the device associated with the first tenant.

9. The processing device of claim 1, wherein the security core is further configured to, in response to receiving another request to access the first plaintext data from an external device and prior to decrypting the first encrypted data to generate first plaintext data, check whether the external device has an authorized access to the first plaintext data.

10. The processing device of claim 9, wherein the security core is further configured to:
reject, based on the checking that the external device has no authorized access to the first plaintext data, the request to access from the external device;
store a log of an inappropriate request to access; and
notify a host of the inappropriate request to access.

11. The processing device of claim 1, wherein the first plaintext data is stored in the first memory or the second memory based on a security level of the first plaintext data.

12. The processing device of claim 1, wherein the security core is further configured to:
determine that the use of the first plaintext data stored in the memory is finished in response to receiving, from the main core, a signal indicating that the use of the first plain text data stored in the memory is finished; and store, based on the determining, a pre-specified value in an area of the memory in which the first plaintext data is stored.

13. A method for confidential computing, the method performed by a security core including one or more processors and comprising:

storing first encrypted data associated with a first tenant in a first memory, wherein the first encrypted data is obtained by performing encryption of first plaintext data using a first encryption key associated with the first tenant, wherein the first encryption key is stored in a second memory in a secure domain, wherein the second memory is configured to be accessible by the security core and is configured to be not accessible by a main core;

in response to receiving a request to access the first plaintext data, decrypting the first encrypted data stored in the first memory using the first encryption key to generate the first plaintext data;

providing the first plaintext data to the main core for processing by the main core;

determining that the first plaintext data will be reused at a later time; and storing, based on the determining, the first plaintext data for later use in a memory, wherein the memory is the first memory or the second memory.

14. The method of claim 13, wherein the decrypting the first encrypted data is performed using a crypto accelerator for acceleration of decryption.

15. The method of claim 13, further comprising storing second encrypted data associated with a second tenant in the first memory, wherein the second encrypted data is obtained by performing encryption of second plaintext data using a second encryption key associated with the second tenant, wherein the second encryption key is stored in the secure domain accessible by the security core, wherein the first and second encryption keys are different from each other.

16. The method of claim 13, wherein the first encrypted data is data received from a device associated with the first tenant.

17. The method of claim 13, further comprising:

prior to storing the first encrypted data associated with the first tenant in the first memory:

receiving third encrypted data from a device associated with the first tenant;

decrypting the third encrypted data using a third encryption key to generate the first plaintext data, wherein the third encrypted data was previously obtained by performing encryption of the first plaintext data using the third encryption key; and encrypting the first plaintext data using the first encryption key as a new encryption key to generate the first encrypted data, wherein the first and third encryption keys are different from each other.

18. The method of claim 17, further comprising encrypting third plaintext data using the third encryption key to generate fourth encrypted data, wherein the third plaintext data is generated as a result of processing the first plaintext data by the main core, and wherein the fourth encrypted data is transmitted to the device associated with the first tenant.

19. The method of claim 13, wherein the first plaintext data is stored in the first memory or the second memory based on a security level of the first plaintext data.

20. The method of claim 13, further comprising, determining that the use of the first plaintext data stored in the memory is finished in response to receiving, from the main core, a signal indicating that the use of the first plain text data stored in the memory is finished, and, based on the determining, storing a pre-specified value in an area of the memory in which the first plaintext data is stored.

* * * * *